May 12, 1953
C. J. COBERLY
2,638,115
FLUID OPERATED PUMP CONTROL
Filed May 10, 1947
2 Sheets-Sheet 1
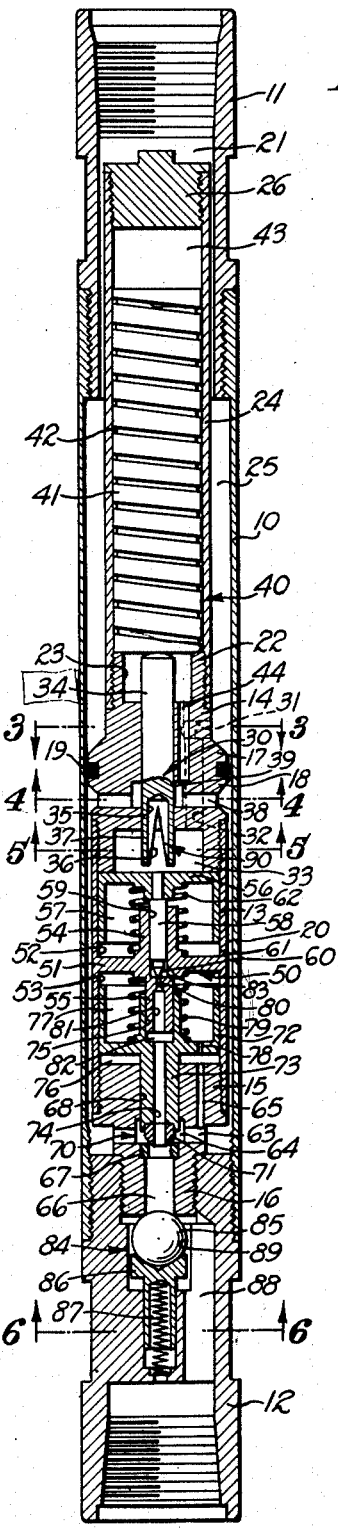
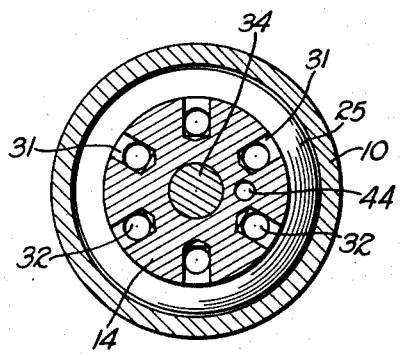
Fig. 3
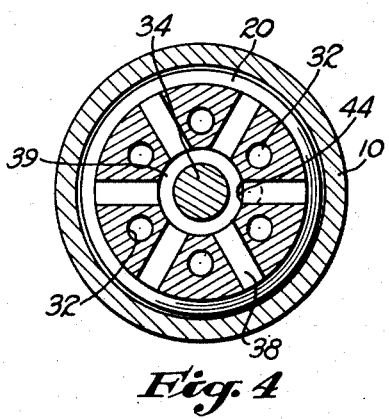
Fig. 4
INVENTOR:
CLARENCE J. COBERLY
BY HIS ATTORNEYS
HARRIS, KIECH, FOSTER & HARRIS May 12, 1953  C. J. COBERLY  2,638,115
FLUID OPERATED PUMP CONTROL
Filed May 10, 1947  2 Sheets-Sheet 2
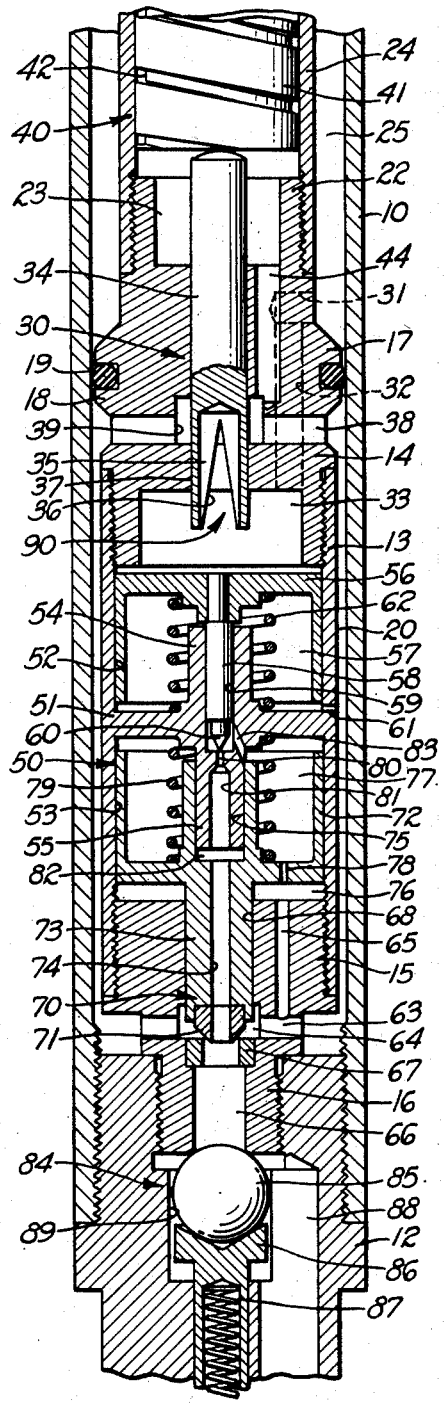
Fig. 2
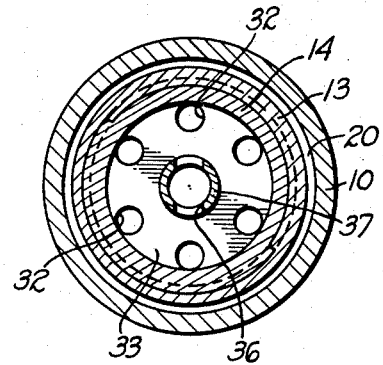
Fig. 5
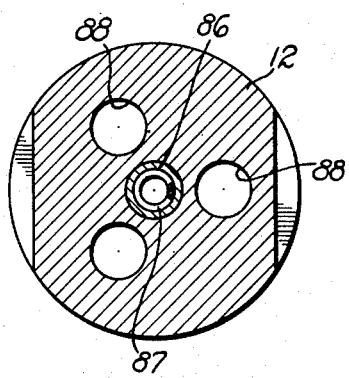
Fig. 6
INVENTOR:
CLARENCE J. COBERLY
BY HIS ATTORNEYS
HARRIS, KIECH, FOSTER & HARRIS
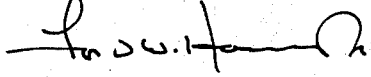

Patented May 12, 1953

2,638,115

UNITED STATES PATENT OFFICE 2,638,115

FLUID OPERATED PUMP CONTROL

Clarence J. Coberly, Los Angeles, Calif., assignor, by mesne assignments, to Dresser Equipment Company, Cleveland, Ohio, a corporation of Ohio Application May 10, 1947, Serial No. 747,234

19 Claims. (Cl. 137—486)

This invention relates to the pumping art, and more particularly to governors for fluid operated pumping equipment.

Primarily this invention is intended for use in the oil industry, and is therefore described in connection with such use, although it is susceptible to other uses, and it is consequently to be understood that I do not intend to be limited to the usage herein described.

In my Patent No. 2,266,356, issued December 16, 1941, for Automatically Governed Pump, I have disclosed a device for governing the rate of flow of operating fluid to a well pump. As the instant invention is an improvement over the device therein disclosed, reference is made to the above-named patent, particularly in relation to details of installation and supply not specifically described herein. A system of pump operation was therein disclosed in which the main valve of the governor controlling the supply of operating fluid was normally in fully open position to afford an adequate supply of fluid to the pump, all of this fluid having to pass between the valve head and valve seat of this single valve. The valve was of the slide-valve type and actuated by a piston exposed to the operating fluid pressures on the high and low pressure sides of a variable-area metering orifice. The piston moves against the resistance of a spring and in itself contains the mechanism for controlling the area of the metering orifice and the action of another piston and spring for regulating the rate of change of the area. This construction necessitated a main valve piston of considerable weight, not adapted respond swiftly to sudden light fluctuations of pressure. When responsive to sudden decreases of pressure at the outlet of the governor, which was its chief function, it was required to move the slide valve the full length of its stroke in order to close it, and a time lag occurred in such closing which was excessive under some conditions of pump operation.

It is therefore a primary object of my invention to provide a flow governing device for fluid operated pumps which is rapidly responsive to fluctuations in pump load to control the rate of flow of operating fluid thereto.

Another object of the invention is to provide a fluid flow governor for fluid operated pumps in which the time lag in the response of the governor to fluctuations in pump load is at a minimum both for increases and decreases of pump load.

Still another object of the invention is to provide a fluid flow governor which will automatically adjust its flow capacity in response to gradual changes in the rate at which operating fluid is supplied thereto, but which will react against sudden changes in either input or outflow to reduce the rate of change to a permitted maximum.

A further object of my invention is to provide a flow governor having a dual valve system controlling the flow through the governor, in which both valves discharge in parallel rather than in series so that their maximum flow capacity is the sum of their individual capacities.

Another object of my invention is to provide a flow governor having dual control valves discharging in parallel and so arranged that flow through one valve actuates the other to permit flow therethrough.

Still another object of my invention is to provide a flow governor having dual control valves of different flow capacities so arranged and so mutually responsive that a slight change in flow through the lesser valve will cause a relatively great change in flow through the larger valve.

A further object of the invention is to provide a flow governor having dual control valves whereof one is a poppet valve and the other is a needle valve, the former being responsive to flow through the latter.

Yet another object of the invention is to provide a flow governor in which the input of fluid is controlled by a slowly acting valve and the discharge is controlled by dual valves in parallel, the latter being responsive to the forces causing the former to act but responding more quickly, and normally held close to a throttling position in order to check rapidly any excessive discharge.

Another object of my invention is to provide a flow governor including a metering orifice, a pilot valve, and a main valve, in which the pilot valve operates in response to the fluid pressure differential across the metering orifice to in turn control the operation of the main valve. A further object of the invention is to provide a variable-capacity metering orifice in such a governor, so that the total flow capacity of the governor may be varied as desired.

Other objects and advantages will appear in the following specification and in the drawings, in which:

Fig. 1 is a vertical sectional view of my invention, showing the valves in the position they assume when there is no flow through the governor and therefore no pressure differential therein;

Fig. 2 is an enlarged fragmentary sectional view, similar to Fig. 1 but showing the valves partly opened to permit flow therethrough;

Fig. 3 is an enlarged horizontal sectional view taken on the line 3—3 of Fig. 1;

Fig. 4 is an enlarged horizontal sectional view taken on the line 4—4 of Fig. 1;

Fig. 5 is an enlarged horizontal sectional view taken on the line 5—5 of Fig. 1; and Fig. 6 is an enlarged horizontal sectional view taken on the line 6—6 of Fig. 1, Figs. 3 to 6 being on the scale of Fig. 2.

Referring to Fig. 1 of the drawings, I show a cylindrical housing 10 having its ends threaded for connection to an upper coupling 11 and a lower coupling 12, by which it may be coupled in the line of an operating fluid supply line, not shown, and suspended in the production fluid tube in a well casing. Within the housing 10 is a cylindrical member 13 having an upper plug 14 threadedly inserted in its upper end and forming a fluid-tight joint with the inner wall of the housing, and a lower plug 15 similarly inserted in its lower end. The lower plug 15 has a depending extension 16 by which it is threadedly engaged and supported by the lower coupling 12, and the upper plug 14 has an annular shoulder 17 making a relatively close fit with the inner wall of the housing 10 and sealed with respect thereto by a sealing ring 19, which may be of the conventional O-type. The shoulder 17 serves to hold the cylindrical member 13 in axial alignment with the housing 10, and spaced therefrom to form an annular passage 20 between the housing and the cylindrical member, sealed from direct communication with the upper end of the housing 10 by the sealing ring 19. The plug 14 has a threaded extension 22 with an internal bore 23. A cylinder 24 is threadedly engaged with the extension 22 and extends upwardly into the bore 21 so as to leave an annular passage 25 communicating with the supply line through the upper coupling 11, and has its upper end closed by a plug 26.

The upper plug 14 and cylinder 24 form a housing for a control valve 30. As shown in Fig. 3, a plurality of horizontal passages 31 lead from the annular passage 25 into the plug 14 and communicate with a corresponding number of vertical passages 32 leading downwardly into a counterbore 33 in the lower end of the plug. Mounted slidably in the plug 14 and extending into the counterbore 33 is a piston 34 having an internal bore 35 at its lower end, and a plurality of V-notches 36 in the wall 37 formed by the bore 35. At a level in the plug 14 registering with the upper end of the annular passage 20 are a plurality of horizontal passages 38 communicating with the annular passage 20 and with an annular groove 39 surrounding the piston 34 in the interior of the plug 14. When the piston 34 is raised so that the V-notches 36 communicate with the annular groove 39, the passages 31 and 32 and bores 33 and 35 and passages 38 form a continuous passage for the admission of operating fluid from the annular passage 25 to the annular passage 20.

A retarding mechanism 40 for retarding the movement of the piston 34 is mounted in the cylinder 24 and comprises a plunger 41 having a length somewhat shorter than the interior length of the cylinder 24 between the plugs 14 and 26 and having a sliding fit within the cylinder 24, and adapted normally to rest by gravity on the upper end of the piston 34 when the piston 34 is raised to open the V-notches 36 and otherwise to rest upon the upper margin of the extension 22 of the plug 14. A helical control groove 42 is formed on the outer surface of the plunger 41 and provides a restricted communication between the internal bore 23 of the upper plug 14 and a space 43 between the upper end of the piston and the plug 26. A vertical passage 44 communicates between the annular groove 39 and the bore 23, and thus, whenever the hereinbefore described continuous passage from the passage 25 to the passage 20 is open, a continuous passage is also open from the passage 25 through the passage 44, bore 23, and groove 42 to the space 43, and this latter continuous passage is always in communication with the passage 20 through the passages 38.

The cylindrical member 13 houses a dual valve system 50 for controlling the discharge of operating fluid from the governor through the lower coupling 12 and thence to the fluid operated pump. The cylindrical member 13 has a partition 51 which divides the interior of the member into an upper bore 52 and a lower bore 53, and which has a central guide boss 54 extending upwardly therefrom into the upper bore 52 and another guide boss 55 extending downwardly into the lower bore 53. A sleeve piston 56 is fitted slidably in the upper bore 52 defining a space 57 below the piston. A valve stem 58 is secured to the piston 56 and extends downwardly with a sliding fit through a bore 59 in the guide boss 54 and terminates in a pilot needle valve 60. A small orifice 61 in the cylinder 13 connects the annular passage 20 with the space 57 to admit fluid thereto so that fluid pressure may be applied to the lower face of the piston 56, the upper face thereof being subject to the pressure in the counterbore 33 of the plug 14. The lower margin of the plug 14, defining the counterbore 33, acts as a stop to limit upward movement of the piston 56, and the piston is urged against the plug 14 by a spring 62, reacting against the partition 51.

The lower plug 15 is provided with circumferentially spaced radial ports 63 leading from the annular passage 20 to a valve chamber 64 in the interior of the plug, and with a vertical passage 65 leading upwardly from the chamber 64 into the chamber formed by the lower bore 53 of the cylinder 13. The lower extension 16 of the plug 15 has a discharge passage 66 leading downwardly from the chamber 64 and is provided at its upper end with a valve seat 67. A guide bore 68 extends downwardly through the plug 15 from the upper face thereof to the valve chamber 64.

A main valve 70, having a poppet head 71 coacting with the valve seat 67 to close the discharge passage 66, is operatively connected to a sleeve piston 72 sliding in the lower bore 53 of the cylinder 13 by a valve stem 73 sliding in the guide bore 68. The poppet head 71 and valve stem 73 have an axial passage 74 extending therethrough, and the valve stem extends upwardly beyond the face of the piston 72 and is there provided with a counterbore 75 having a sliding fit on the guide boss 55. The piston 72 divides the lower bore 53 of the cylinder 13 into a lower chamber 76, communicating with the passage 65, and an upper chamber 77, and is provided with a restricting orifice 78 connecting the two chambers. A compression spring 79, reacting against the partition 51, urges the piston 72 downwardly to tend to retain the poppet head 71 seated against the valve seat 67.

The needle valve 60 is adapted to seat in a suitably small orifice 80 connecting the bore 59 in the upper guide boss 54 with an axial passage 81 in the lower guide boss 55. The passage 81 communicates with the passage 74 through a small chamber 82 formed between the lower end of the guide boss 55 and the lower end of the counterbore 75 to provide freedom of movement for the piston 72. A port 83 connects the upper chamber 77 with the bore 59 adjacent the needle valve 60 and provides a continuous passage, when the needle valve is open, from the annular passage 20 through the radial ports 63, chamber 64, passage 65, chamber 76, orifice 78, and chamber 77, and port 83, to the orifice 80, axial passage 81, chamber 82, axial passage 74, and discharge passage 66. The radial ports 63 and chamber 64, of course, provide direct communication between the annular passage 20 and the discharge passage 66 when the throttle valve 70 is open.

To prevent resurgence of operating fluid through the governor, a check valve 84 is preferably installed in the lower coupling 12, with a ball check 85 normally seated against the lower face of the plug 15 by a follower 86 and a compression spring 87, so as to close the discharge passage 66 unless positive pressure prevails therein. Vertical passages 88 connect a ball chamber 89 with the lower part of the coupling 12.

When the governor is first installed its parts will be in the closed position shown in Fig. 1, in which the metering orifice 90 is closed, the control piston 56 is in its uppermost position, the needle valve 60 is fully open, and the main valve 70 is closed.

Operation of the surface pumping equipment (not shown) will supply operating fluid under pressure to the governor through its upper coupling 11, and the fluid pressure will accordingly rise in the counterbore 23. The fluid pressure in the counterbore 33 exerts a downward force on the top of the control piston 56, and an upward force on the bottom of the piston 34. As the compression spring 62 is relatively weak, only a relatively small rise in fluid pressure in the counterbore 33 is required to move downwardly the control piston 56 and the needle valve 60 carried thereby, tending to close the needle valve. Fluid below the control piston 56 and displaced thereby is discharged through the orifice 61.

A rise in fluid pressure in the counterbore 33 tends also to raise the piston 34 and the plunger 41 resting thereon. The combined weight of the piston 34 and the plunger 41 is such as to exert a downward force greater than the upward force exerted by the spring 62 and, consequently, the control piston 56 moves downwardly as described before the piston 34 starts to move upwardly. A continued rise in fluid pressure in the counterbore 33, however, quickly overcomes the downward force exerted by the combined weights of the piston 34 and plunger 41, and the piston and plunger then start to rise. The rate of upward movement of the plunger 41 is restricted by the dashpot effect provided by the chamber 43 and helical groove 42, as fluid in the chamber 43 must be displaced through the helical groove and the latter is of restricted cross-sectional area. Continued upward movement of the piston 34 causes the upper ends of the V-notches 36 to register with the annular groove 39, to form the metering orifice 90. The pressure of the operating fluid in the counterbore 33 is then communicated through the metering orifice 90, the horizontal passages 38, the annular passage 20, the orifice 61, and the space 57 to the bottom of the control piston 56, so that the fluid pressure on the top and bottom of the control piston quickly tend to equalize, permitting the spring 62 to move the control piston and the needle valve 60 upwardly, to fully open the needle valve.

At the same time that the metering orifice 90 opens, the increase in fluid pressure in the counterbore 33 is communicated to the bottom of the main valve piston 72, through the annular passage 20, the radial ports 63, the valve chamber 64, and the vertical passage 65. Until the needle valve 60 opens, the main valve piston cannot move upwardly if liquid is trapped thereabove. However, as soon as the needle valve 60 opens the fluid pressure acting upwardly on the bottom of the main valve piston 72 quickly overbalances the force exerted by the compression spring 79, causing the main valve piston to move upwardly to its open position shown in Fig. 2. Operating fluid can then discharge downwardly through the discharge passage 66, past the ball check 85, through the vertical passages 88 and the lower coupling 12, and thus to the fluid operated pump disposed therebelow in the well.

Fluid pressure on the downstream side of the orifice 90 (e. g., in the annular groove 39) is communicated to the bottom of the plunger 41, and to the top of the piston 34 through the vertical passage 44 and the bore 23, and to the top of the plunger 41 through the helical groove 42. As soon as a flow of operating fluid through the metering orifice occurs, a fluid pressure differential is impressed across the metering orifice 90 and, consequently, the fluid pressure on the downstream side of the metering orifice will always be less than that in the counterbore 33 during a condition of flow. As the piston 34 moves upwardly, the effective area of the metering orifice 90 increases, thus reducing the fluid pressure differential thereacross. Consequently, the piston 34 moves upwardly until the downward force thereon exerted by the combined weight of the piston 34 and plunger 41 equal the upward force exerted on the bottom of the piston by the fluid pressure differential across the metering orifice 90, at which time such upward movement stops, and the piston 34 then remains in its then position until further change in such pressure differential, with the result that the effective area of the metering orifice remains constant in the absence of such a change in fluid pressure differential across the metering orifice.

While the piston 34 and the plunger 41 are moving upwardly the fluid pressure differential across the metering orifice 90 is greater than required to balance their combined weights and the control piston 56 moves downwardly because the force exerted by the fluid pressure differential thereacross (which is substantially the same as the differential across the orifice 90) is greater than the upward force exerted by the spring 62. When the upward component force of the pressure differential across the metering orifice 90 is in stable equilibrium with the downward component of the combined weight of the piston 34 and plunger 41 the downward force of the pressure differential across the control piston 56 is slightly less than the upward force exerted by the spring 62, at which time the control piston moves upwardly and stops against the lower end of the upper plug 14, and it and the needle valve 60 remain in such open position, shown in Fig. 2.

As will likewise be understood, as soon as the needle valve 60 opens, operating fluid can flow through the restricting orifice 78 into the space 77 above the main valve piston, and thence through the open needle valve port. However, the restricting orifice 78 is of less cross-sectional area than the needle valve orifice 80 and, consequently, during flow conditions there is a substantial fluid pressure drop through the orifice 78, and a fluid pressure differential is impressed across the main valve piston 72 which exerts an upward force tending to move it upwardly. The upward movement of the main valve piston 72 continues until upward force exerted by the fluid pressure differential across the orifice 78 equals the downward force exerted by the spring 79, at which time upward movement of the main valve piston stops so as to retain the main valve 70 partially open.

Under given conditions of flow of operating fluid, within the range for which the governor is designed, the movable parts quickly attain a state of equilibrium in which the metering orifice 90, the needle valve 60, and the main valve 70 are each open a predetermined extent. Operating fluid then flows through the governor from the upper coupling 11 to the lower coupling 12, and thence downwardly in the well to actuate the fluid operated pump. As movement of the control piston 56 and needle valve 60 carried thereby is a function of the fluid pressure differential across the metering orifice 90, and as movement of the main valve piston 72 and the main valve 70 carried thereby is a function of the extent of opening of the needle valve 60, so long as such pressure differential across the metering orifice 90 is maintained constant the main valve 70 will remain open a predetermined extent.

A sudden change in fluid pressure differential across the metering orifice 90, however, immediately results in a corresponding opening or closing of the main valve 70. Such a change in fluid pressure differential across the metering orifice 90 can be caused by a decrease or increase in pump load on the fluid operated pump, or by a decrease or increase in the volume of operating fluid delivered to the coupling 11. For example, a sudden increase in fluid pressure differential across the metering orifice 90 is immediately transmitted to the control piston 56, causing it to move downwardly until such increased pressure differential is again balanced by the spring 62 at which time the control piston will again stop. However, such added downward movement of the control piston 56 further closes the needle valve 60, which in turn further restricts the fluid flow therethrough from the space 77 above the main valve piston 72, resulting in a decrease in fluid pressure differential across the orifice 78. This permits the spring 79 to move the main valve piston 72 downwardly, to further close the main valve 70 and restrict the flow therethrough. On the other hand, a sudden decrease in fluid pressure differential across the metering orifice 90 is transmitted to the control piston 56 and permits the spring 62 to move the control piston upwardly until the forces thereon are again balanced. Such added upward movement of the control piston further opens the needle valve 60, increases the fluid pressure differential across the main valve piston 72, which in turn moves the main valve piston upwardly until the forces thereon are again balanced. Such added upward movement of the main valve piston 72, of course, further opens the main valve 70, to permit an increased volume of flow of operating fluid therethrough.

The governor is preferably so designed that, regardless of the magnitude of a sudden increase in fluid pressure differential across the metering orifice 90, the flow of operating fluid through the governor will not increase more than, say, 10% above the established flow before the increase. Thus, although the fluid pressure drop through the metering orifice 90 may momentarily increase 1000%, the volume of flow of operating fluid through the governor cannot correspondingly increase more than 10%, and the governor operates to maintain the total volume of flow therethrough between predetermined desired limits. This is of the utmost importance in preventing undesirable racing of a fluid operated pump connected to the governor.

Provision is made, however, to permit gradual changes in total volume of flow of operating fluid through the governor, so that the flow capacity of the governor can be readily changed during operation. This is accomplished by increasing or decreasing the effective area of the metering orifice 90, as will be now described.

As pointed out above, any increase in fluid pressure in the counterbore 33 tends to move the piston 34 upwardly, to increase the effective area of the metering orifice 90. Sudden upward movement of the piston 34 is prevented, however, by the dashpot effect of the space 43 above the plunger 41 and the fact that fluid can be displaced from the space 43 only through the helical groove 42 which is of restricted cross-sectional area. Consequently, momentary fluctuations in fluid pressure in the counterbore 33 will not cause the piston 34 to move either upwardly or downwardly to any substantial extent. However, if an increase in fluid pressure in the counterbore 33 is maintained, the piston 34 and plunger 41 will move slowly upwardly, slowly increasing the effective area of the metering orifice 90. As will be apparent, an increase in the effective area of the metering orifice 90 will reduce the fluid pressure drop therethrough, thus reducing the fluid pressure differential across the orifice and, consequently, across the control piston 56. This permits the spring 62 to move the control piston 56 upwardly until the forces acting on it are again balanced, such upward movement further opening the needle valve 60 which, in turn, permits the main valve 70 to open further, to permit an increased volume of operating fluid to flow through the main valve. The reverse action occurs when a reduction in fluid pressure is maintained in the counterbore 33, in which case the main valve 70 is moved towards its closed position, to reduce the volume of flow of operating fluid through the main valve. This construction thus provides a means whereby the normal flow capacity of the governor may be readily varied by simply increasing or decreasing the flow of operating fluid to the governor, which, of course, can be accomplished from the surface of the ground during operation and without removing the governor from the well. Although it is highly desirable to incorporate this feature of my invention in such a governor, it may, if desired, be omitted simply by making the metering orifice 90 of fixed flow capacity.

As will also be apparent from the foregoing description, during a normal condition of uniform flow of operating fluid through the main valve 70, the main valve is always in a partially open, or throttling, position. A very slight closing movement of the main valve 70 will substantially increase its throttling action and, therefore, its time lag in moving to such a position of increased throttling will be much shorter than if the valve were required to move from a wide open position to such a position of increased throttling. This feature of the invention is of primary importance, as in a governor as shown in my said Patent No. 2,266,356 the time lag between a sudden large increase in flow of operating fluid and the closing of the main valve thereof may be sufficient to permit the fluid operated pump connected thereto to race for a part of a stroke before the governor throttles the flow of operating fluid to a safe volume, with attendant damage to the pump. My present governor substantially reduces such time lag, and maintains the flow of operating fluid at all times below a predetermined safe maximum.

Although I have shown and described a preferred embodiment of my invention, it will be apparent to those skilled in the art that the operating characteristics thereof may be varied quantitatively without departing from the spirit of my invention, simply by changing the correlation of the effective cross-sectional areas of the various passages, orifices, and piston, and of the countereffective forces of the plunger 41 and springs 62 and 79. Consequently, my invention should be afforded the full scope of the following claims.

I claim as my invention:

1. In a device for governing the rate of flow of a high pressure fluid, the combination of: a metering orifice adapted to impress a fluid pressure differential upon said fluid; a main valve biased to assume a closed position; and means responsive to a decrease in said pressure differential for causing said main valve to open.

2. In a device for governing the flow in the fluid supply line of a fluid operated pump, the combination of: means forming an orifice through which said pressure fluid passes so as to produce a fluid pressure differential across said orifice; dual valves adapted to discharge said fluid in parallel and having separate inlet passages in series with said orifice; means for actuating one of said valves responsive to said pressure differential; and means for actuating the other of said valves responsive to a pressure differential between two points in the inlet passage of said one valve to move said other valve toward a closed position in response to an increase in said pressure differential across said orifice.

3. In a device for governing the flow in the fluid supply line of a pressure fluid operated pump, the combination of: three valves so arranged that fluid flow through two is in parallel and fluid flow through the third is in series with the said two, one of said parallel valves being adapted to be actuated by a fluid pressure differential across said third valve, and the other of said parallel valves being adapted to be actuated by a pressure differential between two points in the flow channel of said one of said parallel valves, and being movable toward a closed position in response to an increase in the fluid pressure differential across said third valve.

4. In a device for governing the flow in the fluid supply line of a pressure fluid operated pump, the combination of: means adapted to form a fluid metering orifice through which said pressure fluid is adapted to flow so as to produce a first fluid pressure differential; a control piston; means for impressing said first fluid pressure differential across said control piston; a main valve adapted to control the volume of said fluid flowing through the device, said main valve being in series with said orifice; a main valve piston connected to said main valve and having a restricted fluid opening therethrough in parallel with said main valve, said pressure fluid being adapted to flow through said restricted fluid opening so as to produce a second fluid pressure differential; means for impressing said second fluid pressure differential across said main valve piston; and a pilot valve connected to said control piston and in series with said restricted fluid opening, said pilot valve being adapted to vary said second fluid pressure differential.

5. In a governor adapted to be disposed in a well for controlling the rate of flow of an operating fluid to a fluid-operated pump in the well, the combination of: an elongate, cylindrical housing provided with a longitudinal passage therethrough for the operating fluid; metering orifice means in said housing and providing a variable-area orifice in said longitudinal passage through which the operating fluid is adapted to flow, said orifice being adapted to produce a pressure differential in response to flow of the operating fluid therethrough; main valve means in said housing and operable by a difference in fluid pressures applied thereto for controlling the rate of flow of the operating fluid through said longitudinal passage, said main valve means being axially spaced from said metering orifice means; pilot valve means in said housing and responsive to variations in said pressure differential for applying said difference in fluid pressures to said main valve means to move said main valve means toward closed and open positions in response to increases and decreases, respectively, in said pressure differential, said pilot valve means being axially spaced from said main valve means and said metering orifice means; means in said housing for impressing said pressure differential across said pilot valve means to operate said pilot valve means in response to variations in said pressure differential; and means in said housing for varying the area of said orifice.

6. A governor as set forth in claim 5 wherein said metering orifice means, said main valve means and said pilot valve means include components which are movable axially of said elongate, cylindrical housing.

7. In a governor for regulating the rate of flow of an operating fluid, the combination of: metering valve means providing a variable-area orifice and adapted to produce a pressure differential in response to flow therethrough; means for impressing said pressure differential across said metering valve means in a direction tending to increase the area of said orifice as said pressure differential increases; and control valve means actuable by said pressure differential for regulating the rate of flow of the operating fluid, said control valve means including main valve means responsive to a difference in fluid pressures for regulating the rate of flow of the operating fluid, and including pilot valve means responsive to said pressure differential for applying said difference in fluid pressures to said main valve means in a direction to open and close said main valve means with decreases and increases, respectively, in said pressure differential.

8. A governor as set forth in claim 7 wherein said control valve means is in series with said metering valve means so that the operating fluid flows through both said control valve means and said metering valve means.

9. A governor as set forth in claim 7 including hydraulic damping means operatively connected to said metering valve means to delay response of said metering valve means to variations in said pressure differential.

10. A governor according to claim 9 wherein said hydraulic damping means comprises a movable fluid separating means having one side exposed to fluid pressure in a closed chamber, said hydraulic damping means also including a restricted passage communicating at one end with said closed chamber to permit flow at a limited rate into and out of said chamber.

11. A governor as defined in claim 10 wherein the opposite side of said movable fluid separating means is exposed to the fluid pressure obtaining on the downstream side of said orifice.

12. A governor according to claim 7 wherein said pilot valve means and said main valve means are in parallel with respect to each other and are in series with said metering valve means.

13. In a governor for regulating the rate of flow of an operating fluid, the combination of: metering valve means providing a variable-area orifice adapted to produce a pressure differential in response to flow therethrough, said metering valve means being pressure actuable; means for applying said pressure differential to said metering valve means in a direction tending to increase the area of said orifice as said pressure differential increases; pilot valve means actuable by said pressure differential and adapted to produce a pressure difference in response to flow therethrough, whereby variations in said pressure differential produce variations in said pressure difference; and main valve means operable by said pressure difference and controlling flow of said operating fluid for increasing and decreasing resistance to flow of said operating fluid in response to decreases and increases, respectively, in said pressure differential.

14. A governor according to claim 13 wherein said pilot valve means and said main valve means are in series with said metering orifice means and in parallel with each other so that the operating fluid flows through the metering orifice means, the main valve means, and the pilot valve means.

15. In a governor for regulating the rate of flow of an operating fluid, the combination of: metering valve means providing a variable-area orifice adapted to produce a pressure differential in response to flow therethrough, said metering valve means being pressure actuable; means for applying said pressure differential to said metering valve means in a direction tending to increase the area of said orifice as said pressure differential increases; pilot valve means actuable by said pressure differential and movable toward a closed position by an increase in said pressure differential; and main valve means movable toward open and closed positions, respectively in response to increased and decreased flow through said pilot valve means for controlling the rate of flow of the operating fluid.

16. A governor for controlling the rate of flow of an operating fluid, comprising: a main passage for the operating fluid; a valve seat encompassing said main passage; a valve element adapted to engage said valve seat to close said main passage; a movable fluid separating element connected to said valve element for actuating said valve element; a by-pass passage communicating at one end with said main passage upstream from said valve seat and at its other end with said main passage downstream from said valve seat, opposite sides of said fluid separating element being exposed to fluid pressures respectively obtaining at two spaced points in said by-pass passage; and means, including control valve means for regulating the rate of flow of fluid through said by-pass passage, for regulating the relative fluid pressures obtaining at said points in said by-pass passage.

17. In a governor for regulating the flow of an operating fluid, the combination of: metering valve means providing a variable-area metering orifice for producing a pressure differential in response to flow therethrough, said metering valve means being pressure actuable; means for applying said pressure differential to said metering valve means in a direction tending to increase the area of said metering orifice as said pressure differential increases; a pressure-actuable pilot valve for producing a difference in pressure in response to flow therethrough; means for applying said pressure differential to said pilot valve to control said difference in pressure; a pressure-actuable throttling valve for regulating the flow of the operating fluid; and means for applying said difference in pressure to said throttling valve in directions to move said throttling valve toward its open and closed positions in response to decreases and increases, respectively, in said pressure differential.

18. In a governor for regulating the rate of flow of an operating fluid, the combination of: metering valve means providing a variable-area orifice for producing a pressure differential in response to flow of the operating fluid therethrough; pressure-actuable pilot valve means in series with said orifice; means for applying said pressure differential to said pilot valve means to move same between open and closed positions; pressure-actuable main valve means in series with said orifice and in parallel with said pilot valve means for controlling the rate of flow of the operating fluid; and means for applying to said main valve means a difference in pressure produced by said pilot valve means in directions to open and close said main valve means in response to decreases and increases, respectively, in said pressure differential.

19. A governor according to claim 18 including resilient means engaging said pilot valve means and said main valve means for applying thereto forces opposing the hydraulic forces applied thereto so as to cause floating movement of said main and pilot valve means in response to fluctuations in said hydraulic forces.

CLARENCE J. COBERLY.

References Cited in the file of this patent

UNITED STATES PATENTS

| Number | Name | Date |
|---|---|---|
| 894,784 | Vivian | July 28, 1908 |
| 1,860,516 | Thomas | May 31, 1932 |
| 1,904,475 | Kissing | Apr. 18, 1933 |
| 2,266,356 | Coberly | Dec. 16, 1941 |
| 2,354,634 | Griswold | July 25, 1944 |

FOREIGN PATENTS

| Number | Country | Date |
|---|---|---|
| 145,080 | Austria | of 1936 |